United States Patent [19]

Keil

[11] 3,996,202
[45] Dec. 7, 1976

[54] PROCESS FOR THE PREPARATION OF SULFHONATE GROUP CONTAINING AROMATIC POLYAMIDES

[75] Inventor: Günter Keil, Hofheim, Taunus, Germany

[73] Assignee: Hoechst Aktiengesellschaft, Frankfurt am Main, Germany

[22] Filed: Apr. 24, 1975

[21] Appl. No.: 571,440

[30] Foreign Application Priority Data

Apr. 27, 1974   Germany ..................... 2420530

[52] U.S. Cl. .................. 260/78 R; 260/49; 260/63 R; 260/78 SC
[51] Int. Cl.² ................................ C08G 69/42
[58] Field of Search ............. 260/78 R, 78 SC, 49, 260/63 R, 78 TF

[56] References Cited

UNITED STATES PATENTS

| | | | |
|---|---|---|---|
| 3,574,169 | 4/1971 | D'Alelio | 260/78 |
| 3,821,168 | 6/1974 | Keil | 260/49 |
| 3,860,560 | 1/1975 | Davis et al. | 260/49 |

*Primary Examiner*—Lester L. Lee
*Attorney, Agent, or Firm*—Curtis, Morris & Safford

[57] ABSTRACT

Fibers, filaments and sheets from aromatic polyamides which are dyeable with cationic dyestuffs are prepared by solution polycondensation of
  a. aromatic dicarboxylic acid dichlorides optionally containing up to 5 mol % of aliphatic and/or cycloaliphatic dicarboxylic acid dichlorides
  b. aromatic diamines optionally containing up to 5 mol % of aliphatic and/or cycloaliphatic diamines, and
  c. 2 to 15 mol %, relative to the total amount of dicarboxylic acid dichlorides, of 4-chlorocarbonyl-sulfobenzoic acid anhydride of the formula

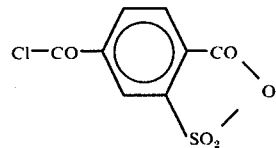

and subsequent neutralization and spinning.

1 Claim, No Drawings

PROCESS FOR THE PREPARATION OF SULFONATE GROUP CONTAINING AROMATIC POLYAMIDES

The present invention relates to a process for the preparation of sulfonate group containing aromatic polyamides.

Fibers and filaments of aromatic polyamides are distinguished by high thermostability and low flammability. Because of their compact structure and their high second order transition temperature, they practically cannot by dyed by means of disperse dyestuffs, that is, dyestuffs which are not fixed to the fibers via salt-type bridges. It is therefore known to prepare sulfonate group containing polyamides in order to improve the dyeability by basic dyestuffs.

The aromatic polyamides required as fiber substance are advantageously prepared by two-phase condensation or by lowtemperature solution polycondensation of aromatic dicarboxylic acid dichlorides with aromatic diamines. Such acylation processes with bifunctional compounds are for example described in U.S. Pat. Nos. 3,006,899 and 3,063,966. The highest molecular weights are obtained when the dicarboxylic acid dichlorides are reacted with the corresponding diamines in N-alkylated acid amides such as dimethylacetamide, N-methylpyrrolidone or tetramethyl urea at temperatures of from −30° to +30° C.

The preparation of copolyamides having improved dyeability by basic dyestuffs is also known. In U.S. Pat. No. 3,184,436, for example, there is described the modification of polyamides with diaminosulfonic acids or dicarboxysulfonic acids or the salts thereof. In U.S. Pat. No. 3,506,990, dyeing of copolymers of m-phenylene-isophthalic acid amide or of N,N'-m-phenylene-bis-(m-aminobenzamide)-isophthalic acid amide containing 2,4-diaminobenzenesulfonate as cocomponent is described. In German Offenlegungsschrift No. 2,122,368, the use of dicarboxysulfonic acid trichlorides as cationaffine comonomer is claimed.

The cited processes, however, require either the use of expensive modification components or special polycondensation methods.

It has now been found that sulfonate group containing, linear, fully or substantially aromatic polyamides are obtained in an especially advantageous manner by solution polycondensation of aromatic dicarboxylic acid dichlorides and aromatic diamines, optionally containing up to about 5 mol % of aliphatic and/or cycloaliphatic dicarboxylic acid dichlorides and diamines, when about 2 to 15 mol %, preferably 5 to 10 mol %, of 4-chlorocarbonyl-2-sulfobenzoic acid anhydride of the formula

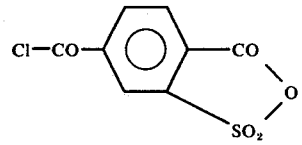

are added as comonomer. From these polyamides fibers, filaments and sheets well dyeable with cationic dyestuffs may be manufactured according to known processes.

4-chlorocarbonyl-sulfobenzoic acid anhydride may be prepared, for example, from 4-carboxy-2-sulfobenzoic acid anhydride (preparation of this compound according to German Offenlegungsschrift No. 2,124,173, for example) and thionyl chloride, or, in an escpecially advantageous manner, in a single-step process, from trisodium-sulfoterephthalic acid and thionyl chloride, according to the following scheme

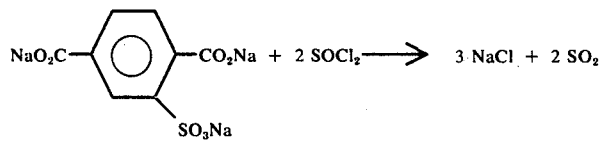

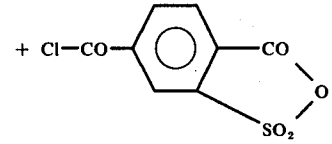

It has furthermore been found that 4-chlorocarbonyl sulfobenzoic acid anhydride reacts quantitatively with aromatic and/or aliphatic amines in aprotic N-alkylamide solvents, such as dimethylacetamide, N-methyl pyrrolidone or tetramethyl urea, at temperatures of from −30° to +30° C, according to the following scheme

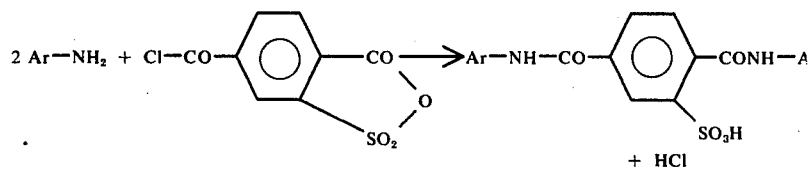

When using diamines, sulfonic acid containing polyamides (homopolymers) are obtained according to this method.

When from 5 to 15 mol %, preferably from 5 to 1 mol %, of 4-chlorocarbonyl-sulfobenzoic acid anhydride (relative to the total amount of the dicarboxylic acid dichlorides) are added to a solution polycondensa tion of substantially aromatic dicarboxylic acid dichlorides with substantially aromatic diamines, the 4-chlorocarbonyl-sulfobenzoic acid anhydride is incorporated, and interesting polyamides are obtained which are especially appropriate for the manufacture of fibers, filaments or sheets, and which are easily dyeable with cationic dyestuffs.

As compared to known processes for the preparation of sulfonate group containing, substantially aromatic polyamides, the advantage of the process of the invention resides in the fact that the comonomers required can be very easily prepared and purified.

For example, U.S. Pat. No. 3,184,436 cites 5-sulfoisophthaloyl chloride as comonomer. However, this compound can be prepared in pure form only with great difficulties, and according to the indications given in this patent specification, the corresponding polyamides show a grey to pink discoloration. 4-chlorocarbonyl-sulfobenzoic acid anhydride, on the other hand, according to the present invention, can be easily prepared and, above all, purified by distillation. This substance is very stable and readily soluble in the aprotic solvents usually employed in polycondensation. The normal course of the polycondensation is not disturbed by addition of this compound, so that, if desired, this comonomer may be incorporated without difficulty even in higher concentrations. Contrary to U.S. Pat. No. 3,184,436, the copolyamides prepared according to the process of the invention are not at all discolored.

The solution polycondensation using the comonomer according to the invention is carried out in known manner, as is normal in the case of aromatic polyamide preparation. The aromatic diamines (for example 4,4'-diaminodiphenyl ether, 4,4'-diaminodiphenyl sulfide, 4,4'-diaminodiphenyl sulfone, 4,4'-diamino-2,2'-dimethyldiphenyl, 4,4'-diaminodiphenylmethane, 4,4'-diaminodiphenylethane, 4,4'-diaminobenzophenone, 1,5-diaminonaphthalene etc., especially m-phenylenediamine) are dissolved in a solvent of the amide type (for example, N,N-dimethylacetamide, N-methylpyrrolidone or tetramethyl urea) and, at temperatures of from about −30° to +20° C, the amount of carboxylic acid equivalent to the amino groups of the aromatic amines, that is, of aromatic dicarboxylic acid dichlorides (for example, 1,4-naphthalenedicarboxylic acid dichloride, 4,4'-diphenyldicarboxylic acid dichloride, 1,3-diphenoxypropane-4',4'dicarboxylic acid dichloride, 5-methylisophthalic acid dichloride, 5-t-butylisophthalic acid dichloride etc., especially isophthalic or terephthtalic acid dichloride) is added, as well as from 2 to 15 mol %, preferably from 5 to 10 mol %, of 4-chlorocarbonyl-sulfobenzoic acid anhydride. Up to about 5 mol % of the aromatic dichlorides and diamines may be replaced by aliphatic and/or cycloaliphatic dichlorides and diamines (for example adipic, sebacic, 1,4-cyclohexanedicarboxylic acid dichloride etc.; ethylenediamine, tri- or tetramethylenediamine, 1,4-cyclohexane-dimethylamine etc.). After the total amount of dichloride is added, the temperature is raised to about 30° C. After the desired polycondensation degree is attained, the polymer solution is reacted with bases in order to neutralize the hydrogen chloride formed and the sulfonic acid groups.

For this purpose, there are preferably used basic compounds of the 1st and 2nd group of the Periodic Table (for example LiOH or Ca(OH)₂). In analogy to known processes, this process may be modified in such a manner that only about 90 – 95% of the required amount of acid chloride are added to the amine solution, the hydrogen chloride formed is neutralized with NH₃, the NH₄Cl precipitated is filtered off, the remaining amount of acid chloride and the modification agent are added to the filtrate, which is allowed to completely react and which is then neutralized with Ca(OH)₂. By this method, a spinning solution is obtained containing only a small amount of salt which is necessary for stabilization. The polymer contains then, among others, the following structural unit

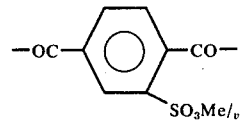

where Me is a metal ion of the 1st or 2nd group of the Periodic Table, and V is the valency of the cation. The polymer solution prepared in the manner as described may be spun according to a wet or dry spinning process. It is also possible to isolate the polymer by pouring the solution into a coagulation agent, for example water, washing the precipitated polymer to liberate it from salt, and drying it. For the manufacture of spun filaments, the polymer is then dissolved in a solvent suitable for the solution of aromatic polyamides, and subsequently spun according to a wet or dry spinning process.

The filaments drawn and fixed according to known methods have good mechanical properties and a high affinity to cationic dyestuffs.

When the sulfonate group containing polyamides prepared according to the present invention are dyed with cationic dyestuffs, the alkali metal or alkaline earth metal cations Me of the sulfonate groups are replaced by the dyestuff cations D, whereby chain members of the following structure are formed:

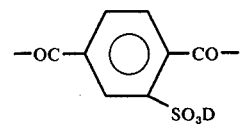

Because of the salt-type bond of the dyestuffs, the dyeings are fast to washing and to rubbing.

The following examples illustrate the invention. The inherent viscosity $\eta_{inh}$ is defined by the following equation: $\eta_{inh} = (1/c) \, ln\,\eta_{rel}$ and it is measured at 25° C on 0.5% solutions in concentrated sulfuric acid.

EXAMPLE 1

200 g of trisodium salt of sulfoterephthalic acid and 2.4 l of thionyl chloride are refluxed for 5 hours. The NaCl precipitated is filtered off, and the filtrate is rapidly concentrated. The residue is distilled. At a boiling point of 158° – 159° C at 0.6 mm Hg, 112.4 g of 4-chlorocarbonylsulfobenzoic acid anhydride are obtained in the form of a slightly yellow, viscous substance which slowly crystallizes. The product has a melting point of 82° – 83° C, and it may be recrystallized from benzene/cyclohexane.

Under a nitrogen atmosphere, 1080 g of m-phenylenediamine are dissolved in 9500 ml of dry dimethylacetamide, and the solution is cooled to −20° C. Subsequently, 1928 g of isophthaloyl chloride in molten state are introduced in such a manner that the reaction mixture is not heated to a temperature above +20° C. 123 g of 4-chlorocarbonyl-sulfobenzoic acid anhydride (5 mol %) are then introduced, and the temperature is raised to 28° C. Agitation is continued at this temperature for 3 hours, the mixture is diluted with 3500 ml of dimethyl acetamide, and neutralized with 741 g of Ca(OH)$_2$, while cooling well. The polymer is precipitated by pouring the solution into water, washed for 90 minutes at 60° C, while replacing the water 5 times, until a remaining ash content of 0.04% is obtained, and the polymer is then dried at 120° C/200 mm Hg. 2380 g of polyamide having an inherent viscosity of 1.70 and a sulfur content of 0.67% are obtained. A 21% solution of the product in dimethylacetamide which contains 2% of CaCl is prepared, and this solution is spun into an aqueous coagulation bath containing CaCl$_2$ and dimethylacetamide. The filaments are drawn to 5.5 times their length and fixed at 310° C. The filaments have a strength of 4.3 g/dtex, an elongation at break of 31.3% and a remission of 74.5%.

The remissoin is generally measured by means of an electric remission photometer "Elrepho" of Messrs. Zeiss, Oberkochen; the white standard being barium sulfate, the measuring filter being marked R$_y$:10.

In order to eliminate the processing agent, the filaments are washed for 30 minutes at 50° C in a solution containing 0.5% of soap and 0.2% of soda.

5 parts of the filament material prewashed in the above manner are dyed for one hour at 125° C, under the corresponding steam pressure, in a bath containing the following components: 200 parts of water, 0.1 part of 30% acetic acid and 0.1 part of a cationic dyestuff of the kind as indicated below. Advantageously, 0.5 to 1.5 parts of a carrier are also added. Suitable carriers are for example aromatic substances, such as alkylaromatic, chloro-aromatic substances, phenols, esters, aldehydes or amides. The filaments deeply dyed are then washed for 10 minutes at 60° C with a nonionic detergent of the ethylene oxide polyaddition product type. The dyeings have an excellent fastness to wetting and rubbing.

Instead of the pressure dyeing process at 125° C, it is also possible to dye the filaments at 100° C. In this case, however, the carrier concentration must be correspondingly raised. Suitable cationic dyestuffs are for example the following products (C.I. = Colour Index Second Ed. 1956; Supplement = Supplement 1968):

C.I. Basic Violet 7; No. 48 020
C.I. Basic Red 25; Supplement p. 162
C.I. Basic Red 29; Supplement p. 163
C.I. Basic Red 22; Supplement p. 161
C.I. Basic Violet 20; Supplement p. 167
C.I. Basic Yellow 13; C.I. p. 1622
C.I. Solvent Green 1; No. 42 000 B
C.I. Basic Blue 54; Supplement p. 175
C.I. Basic Blue 40; Supplement p. 172

EXAMPLE 2

108 g of m-phenylenediamine are dissolved in 850 ml of dimethylacetamide and reacted with 182.7 g of isophthaloyl chloride at temperatures of from −20° to +10° C. This socalled precondensate which still contains amino groups is neutralized with gaseous NH$_3$ at temperatures of from 0° to 20° C, until a pH of 6.8 is attained. The NH$_4$Cl precipitated is filtered off, and the filtrate is reacted with 12.3 g of 4-chlorocarbonyl-sulfobenzoic acid anhydride (5mol %) and with 6.95 g of isophthaloyl chloride. The final temperature is 30° C. Subsequently, the reaction product is diluted with 7.4 g of dimethylacetamide and neutralized with 7.4 g of Ca(OH)$_2$. This polymer solution is spun into an aqueous coagulation medium containing CaCl$_2$, the filaments are drawn to the 4.85-fold of their length and fixed at 300° C. A filamnet strand having a total titer of 211 dtex, an ultimate tensile strength of 3.0 g/dtex, an elongation at break of 23.7% and a remission of 65.5% is obtained. The inherent viscosity is 1.99 and the sulfur content 0.63%.

Dyeing is carried out as described in Example 1. The intense dyeings have an excellent wet fastness and fastness to rubbing.

EXAMPLE 3

At a temperature of from −15° to +5° C, 1827 g of molten isophthaloyl chloride and 246 g of molten 4-chlorocarbonylsulfobenzoic acid anhydride (10 mol %) are added dropwise to a solution of 1080 g of phenylenediamine in 9500 ml of dry dimethylacetamide. After the heating effect has come to an end, the reaction mixture is heated to 30° C, and subsequently allowed to completely react at this temperature. The mixture is then diluted with 4000 ml of dimethylacetamide and neutralized with 741 g of Ca(OH)$_2$, while cooling. The polymer is precipitated by means of water, washed in order to liberate it from salt, and dried. 2.4 kg of polyamide are obtained having an inherent viscosity of 1.33 and a sulfur content of 1.3%.

A 24% solution of the polymer in a 2% CaCl$_2$/dimethylacetamide solution is prepared which is spun into an aqueous coagulation medium containing CaCl$_2$ and dimethylacetamide, the filament are drawn to the 4.1-fold of their length and fixed at 320° C. The filaments have a tensile strength of 2.5 g/dtex, an elongation at break of 28% and a remission of 72.4%.

Dyeing with cationic dyestuffs are extremely intense and cause complete exhaustion of the dyeing baths.

EXAMPLE 4

At a temperature of from −15° to +4° C, a solution of 108 g of m-phenylenediamine in 950 ml of dimethylacetamide is reacted with 192.8 g of isophthaloyl chloride and 12.3 g of 4-chlorocarbonyl-sulfobenzoic acid anhydride (5 mol %). After 3 hours, the reaction mixtue is heated to 30° C, and allowed to completely react at this temperature for another hour. Neutralization with 50.4 g of LiOH is carried out while cooling, the polymer is precipitated, washed to liberate it from salt, and dried. The polymer has an inherent viscosity of 1.44 and a sulfur content of 0.65%.

A 22% solution of this polymer in CaCl$_2$/dimethylacetamide is spun according to a wet spinning process. Filaments are obtained having a tensile strength of 2.7 g/dtex, an elongation at break of 33% and a remission of 75.2%.

Dyeings with cationic dyestuffs obtained at 125° C are intense and fast to washing.

EXAMPLE 5

108 g of m-phenylenediamine are dissolved in 950 ml of dimethylacetamide and, at a temperature of −12° to +6° C, reacted with 182.7 g of isophthaloyl chloride and 24.7g of 4-chlorocarbonyl-sulfobenzoic acid anhydride (10 mol%). The reaction is completed at 24° C. Neutralization with 50.4 g of LiOH is carried out while cooling. The polymer preicpitated, washed and dried has an inherent viscosity of 0.96 and a sulfur content of 1.2%.

The filaments obtained by wet spinning of a 22% spinning solution of this polymer have a tensile strength of 2.6 g/dtex, an elongation at break of 30% and a remission of 74.8%, and they are dyed with cationic dyestuffs in an intense and fast to washing manner.

EXAMPLE 6

At a temperature of from −7° to −4° C, 192.85 g of isophthaloyl chloride, and, at a temperature of from 18° to 29° C, 12.3 g of 4-chlorocarbonyl-sulfobenzoic acid anhydride (5 mol %) are added to a solution of 108 g of m-phenylenediamine in 950 ml of tetramethyl urea. The reaction is allowed to continue for 12 hours at about 25° C, and the reaction mixture is then neutralized with 74.1 g of Ca(OH)$_2$ while cooling. After the usual work-up, a polyamide having an inherent viscosity of 1.33 and a sulfur content of 0.63% is obtained. The product is spun from dimethylacetamide/CaCl$_2$. Filaments are obtained having a tensile strength of 2.5 g/dtex, an elongation at break of 39% and a remission of 73.6%. They have a high affinity to cationic dyestuffs.

EXAMPLE 7

108 g of m-phenylenediamine are dissolved in 950 ml of N-methylpyrrolidone and reacted with 192.85 g of isophtaloyl chloride and 12.3 g of 4-chlorocarbonyl-sulfobenzoic acid anhydride (5 mol%) at temperatures of from −25° to −2° C. After the heating effect has come to an end, agitation is continued for a further 2 hours at a temperature of from 25° to 30° C, the reaction product is neutralized with 74.1 g of Ca(OH)$_2$ and worked up as usual. A polyamide having an inherent viscosity of 1.38 and a sulfur content of 0.65% is obtained.

By spinning of a 22% solution of this polymer in dimethylacetamide/CaCl$_2$, filaments are obtained having a tensile strength of 2.4 g/dtex, an elongation at break of 46% and a remission of 72.7%. The dyeability with cationic dyestuffs is very good.

EXAMPLE 8

At a temperature of from −26° to +4° C, 182.7 g of isophtaloyl chloride, 12.3 g of 4-chlorocarbonyl-sulfobenzoic acid anhydride (5 mol %), and 9.15 g of adipic acid dichloride are added within 35 minutes to a solution of 108 g of m-phenylenediamine in 950 ml of dimethylacetamide. Agitation is continued for 210 minutes at temperatures being raised from 4° to 26° C. After cooling again, the reaction mixture is neutralized with 74.1 g of Ca(OH)$_2$, precipitated washed until it is free from salt, and dried. A polymer having an inherent viscosity of 1.27 and a sulfur content of 0.65% is obtained.

By spinning a 24% spinning solution of this polymer, filaments are obtained having a tensile strength of 2.5 g/dtex, an elongation at break of 46% and a remission of 65.8%.

These filaments are very deeply dyed with cationic dyestuffs, and dyeings, of a medium depth are obtained when disperse dyestuffs such as C.I. Disperse Orange 32 (Supplement p. 190) and C.I. Disperse Blue 56 (Supplement p. 213) are used.

EXAMPLE 9

1026 g of m-phenylenediamine and 82 g of 2.4-diaminoacetanilide (5 mol %) are dissolved in 9.5 l of dimethylacetamide and reacted with 1827 g of isophthaloyl chloride at a temperature of from −18° to +2° C. This "precondensate" is neutralized with gaseous NH$_3$, at a temperature of from 0° to 20° C, until a pH of 6.8 is attained. The NH$_4$Cl precipitated is filtered off by means of a pressure filter. The filtrate is reacted at a temperature of from 10° to 25° C with 123 g of 4-chlorocarbonyl-sulfobenzoic acid anhydride (5 mol %) and 101.5 g of isophthaloyl chloride. The reaction mixture is then diluted with 1 l of dimethylacetamide and neutralized with 74.1 g of Ca(OH)$_2$. This polymer solution is spun into an aqueous coagulation bath containing dimethylacetamide and CaCl$_2$. Filaments are obtained having a tensile strength of 2.1 g/dtex, an elongation at break of 27%, an inherent viscosity of 1.37 and a sulfur content of 0.64%. They are very well dyeable with cationic dyestuffs.

EXAMPLE 10

At a temperature of from −26° to +6° C, a solution of 108 g of m-phenylenediamine and 10.6 g of 4,4'-diaminodiphenylethane (5 mol %) in 950 ml of dimethylacetamide is reacted with 203 g of isophthaloyl chloride, and with 12.3 g of 4-chlorocarbonyl-sulfobenzoic acid anhydride (5 mol %) at a temperature of 8° to 28° C. The reaction product is neutralized with 74.1 g of Ca(OH)$_2$, precipitated, washed and dried. The polymer has an inherent viscosity of 1.08 and a sulfur content of 0.58%.

By spinning a 26% spinning solution, filaments are obtained having a tensile strength of 2.1 g/dtex, an elongation at break of 30% and a remission of 72.7%. They are very well dyeable with cationic dyestuffs. Disperse dyestuffs as cited in Example 8 yield dyeings having a medium depth.

EXAMPLE 11

In the manner as described in the preceding Examples, 1080 g of m-phenylenediamine in 9.5 l of dimethylacetamide are reacted with 1544 g of isophthaloyl chloride, 386 g of terephthaloyl chloride (5 mol %) and 123 g of 4-chlorocarbonylsulfobenzoic acid anhydride (5 mol %), and neutralized with 741 g of Ca(OH)$_2$. 2300 g of polymer are obtained having an inherent viscosity of 1.25 and a sulfur content of 0.66%. Filaments of this polymer are very well dyeable with cationic dyestuffs.

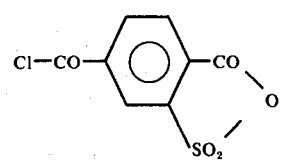

What is claimed is:

1. In a process for the manufacture of articles selected from fibers, filaments and sheets by polycondensing a sulfur-containing monomer with an aromatic dicarboxylic acid dichloride, an aromatic diamine and from 0 to about 5 mole percent, based on the total amount of dicarboxylic acid, of a monomer selected from aliphatic and cycloaliphatic dicarboxyic acid dichlorides and diamines, and forming said article from the resulting polymer, the improvement which comprises using as the sulfur-containing monomer about 2 to 15 mole percent, based on the total amount of dicarboxylic acid units, of a compound of the formula: